(12) United States Patent
Sathananthan et al.

(10) Patent No.: US 11,091,995 B2
(45) Date of Patent: Aug. 17, 2021

(54) SUBSEA PROCESSING OF WELL FLUIDS

(71) Applicant: Subsea 7 Norway AS, Stavanger (NO)

(72) Inventors: Ratnam Sathananthan, Westhill (GB);
James Arkley Pollock, Sola (NO);
Sigbjorn Daasvatn, Hornnes (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 16/116,854

(22) Filed: Aug. 29, 2018

(65) Prior Publication Data

US 2018/0371888 A1    Dec. 27, 2018

Related U.S. Application Data

(62) Division of application No. 14/654,546, filed as application No. PCT/EP2013/077001 on Dec. 17, 2013, now Pat. No. 10,066,472.

(30) Foreign Application Priority Data

Dec. 21, 2012 (GB) ...................................... 1223326

(51) Int. Cl.
*E21B 43/36* (2006.01)
*E21B 33/035* (2006.01)
(Continued)

(52) U.S. Cl.
CPC ............ *E21B 43/36* (2013.01); *B01D 17/042* (2013.01); *E02B 17/02* (2013.01); *E02B 17/04* (2013.01); *E21B 17/18* (2013.01); *E21B 33/035* (2013.01); *E21B 36/00* (2013.01); *E21B 37/00* (2013.01); *E21B 43/013* (2013.01); *F16L 1/12* (2013.01); *F28D 1/022* (2013.01); *F28D 7/106* (2013.01); *F28F 19/00* (2013.01); *B63B 35/03* (2013.01);
(Continued)

(58) Field of Classification Search
CPC ....................................................... E21B 43/36
See application file for complete search history.

(56) References Cited

U.S. PATENT DOCUMENTS 3,590,919 A   7/1971  Talley
5,154,741 A   10/1992 da Costa Filho
(Continued)

FOREIGN PATENT DOCUMENTS

EP    0 336 492    10/1989
EP    1 353 038    10/2003
(Continued)

OTHER PUBLICATIONS

Watson, Iain et al., "Bundle PipelineSystems & Shell FRAM Development," XP055119792, URL:http://www.subseauk.com/documents/subs ea uk lunch and learn 2012.pdf, Mar. 21, 2012.
(Continued)

*Primary Examiner* — Peter Keyworth
(74) *Attorney, Agent, or Firm* — Levy & Grandinetti

(57) ABSTRACT

A wax control element for subsea processing of well fluids in a wellstream comprises a bundle of flowlines within an elongate tensile structure. That structure defines inlet and outlet ends and has cooling and heating provisions that act on the flowlines, in use, to promote deposition of wax in the flowlines and subsequent entrainment of wax in the wellstream.

3 Claims, 9 Drawing Sheets

(51) Int. Cl.

| | | |
|---|---|---|
| *E21B 43/013* | (2006.01) | |
| *E02B 17/04* | (2006.01) | |
| *E02B 17/02* | (2006.01) | |
| *B01D 17/04* | (2006.01) | |
| *F28D 1/02* | (2006.01) | |
| *F28F 19/00* | (2006.01) | |
| *F28D 7/10* | (2006.01) | |
| *F16L 1/12* | (2006.01) | |
| *E21B 36/00* | (2006.01) | |
| *E21B 37/00* | (2006.01) | |
| *E21B 17/18* | (2006.01) | |
| *E02B 17/00* | (2006.01) | |
| *B63B 35/03* | (2006.01) | |
| *F16L 9/19* | (2006.01) | |

(52) U.S. Cl.
CPC ......... *E02B 2017/0047* (2013.01); *F16L 9/19* (2013.01)

(56) References Cited

U.S. PATENT DOCUMENTS

| 8,430,169 | B2* | 4/2013 | Stoisits | E21B 37/06 |
| | | | | 166/344 |
| 2003/0056954 | A1 | 3/2003 | Headworth | |
| 2004/0040716 | A1 | 3/2004 | Bursaux | |
| 2009/0020288 | A1 | 1/2009 | Balkanyi et al. | |
| 2010/0300486 | A1 | 12/2010 | Hoffman et al. | |
| 2011/0033244 | A1 | 2/2011 | Pollack et al. | |

FOREIGN PATENT DOCUMENTS

| GB | 2468920 | 9/2010 |
| WO | WO 00/25062 | 5/2000 |
| WO | WO 03/078793 | 9/2003 |
| WO | WO 03/087535 | 10/2003 |
| WO | WO 2004/033850 | 4/2004 |
| WO | WO 2006/068929 | 6/2006 |
| WO | WO 2007/018642 | 2/2007 |
| WO | WO 2008/037267 | 4/2008 |
| WO | WO 2009/051495 | 4/2009 |
| WO | WO 2010/009110 | 1/2010 |
| WO | WO 2010/151392 | 12/2010 |
| WO | WO 2012/099344 | 7/2012 |
| WO | WO 2012/149620 | 11/2012 |
| WO | WO 2012/163996 | 12/2012 |

OTHER PUBLICATIONS

Brown, Lloyd et al., "Design of Britannia's Subsea Heated Bundle for a 25 Year Service Life," Offshore Technology Conference, Jan. 1, 1999, XP055123592.

Den Boer, A.S. et al., "An Integrated Towed Flowline Bundle Production System for Subsea Developments," OTC 6430, Offshore Technology Conference 1990.

Brydon, Jim et al., "Enhancing Subsea Production Using Pipeline Bundle Systems," Proceedings of Offshore Mechanics and Arctic Engineering, OMAE2001/PIPE-41, Jun. 3, 2001.

Dercksen, Albertus, "Recent Developments in the Towing of Very Long Pipeline Bundles Using the CDTM Method," OTC-7297-MS, Offshore Technology Conference, May 3, 1993.

* cited by examiner

SUBSEA PROCESSING OF WELL FLUIDS

This Application is a divisional of application Ser. No. 14/654,546 filed on Jun. 21, 2015, which was a 35 U.S.C. § 371 national phase conversion of PCT/EP2013/077001 filed on Dec. 17, 2013, which claims priority to Great Britain Application Number 1223326.8 filed on Dec. 21, 2012.

This invention relates to subsea processing or treatment of well fluids in oil and gas production from subsea wells. Some embodiments of the invention employ a wax removal system to enable 'cold flow' oil and gas transportation in a subsea environment.

After extraction at a subsea wellhead, well fluid (which may comprise crude oil and/or natural gas) is carried as a wellstream along a seabed pipeline or 'tie-back' and then up a riser to a surface unit for temporary storage and onward transportation. Some examples of surface units are platforms, Floating Process, Storage and Offloading vessels (FPSOs), onshore plants and Floating Liquefaction of Natural Gas vessels (FLNGs). Tie-backs can extend for many kilometres; there is a trend toward longer tie-backs, 150 km for example, as oil and gas production extends into deeper and more challenging waters.

At some point, the wellstream must be processed, for example to separate out water, gas and solid-phase material such as sand entrained in the wellstream. Processing may be performed at the surface unit but over the past twenty years, there has been a drive to adopt subsea processing. Subsea processing may also involve pre-processing, allowing for further processing steps to take place at the surface unit.

In general, subsea processing of the wellstream may involve pumping to increase its flow rate and/or pressure; separation of sub-products such as water, gas and solid-phase material; and warming or cooling the wellstream to achieve the best flow rate. More specifically, subsea processing technology encompasses functions such as manifolding, water/oil/gas separation, water cleaning, boosting, water re-injection, de-waxing, gas compression, power supply and controlling.

The main market drivers for subsea processing are increased productivity, increased recovery, improved flow assurance, longer tie-back distances and reduced topside processing requirements. In particular, subsea processing may simplify flow assurance in the pipeline and in the riser, improve production efficiency and improve the integrity of the pipeline and the riser. In this respect, the wellstream can only pass up the riser to reach a surface processing unit if the wellstream has a high enough pressure, temperature and flow rate at the bottom of the riser. For example, if the temperature is too low and if there is enough water in the wellstream, wax or hydrate compounds may form and deposit inside the pipeline and so restrict or eventually block the flow. Also, subsea processing removes potentially damaging content of the wellstream, such as water and sour compounds (for example $H_2S$) that promote corrosion and sand that causes erosion.

FIGS. 1 and 2 are greatly-simplified schematic diagrams of prior art solutions that involve subsea processing of a wellstream. Like numerals are used for like features. The direction of production flow in each case is from left to right as shown, from a wellhead 10 along a pipeline 12 laid across the seabed 14 to a riser 16. The pipeline 12 has one or more termination structures 18 that may, for example, be a Pipeline End Termination (PLET) or a manifold that gathers well fluid coming from several lines and may also include one or more pig launchers/receivers. A subsea processing unit 20 receives and processes the wellstream before it flows up the riser 16. Jumper pipes or spools 22 are used to connect the various elements as shown. A power umbilical 24 shown in FIG. 1 extends from a surface unit (not shown) to provide power to the subsea processing unit 20.

The solutions in FIGS. 1 and 2 differ in the relative positions of the pipeline 12 and the processing unit 20. In FIG. 1, the processing unit 20 is downstream of the pipeline 12, interposed between the pipeline 12 and the riser 16. The riser 16 is shown here in the form of a riser column or tower. Conversely, FIG. 2 shows the processing unit 20 upstream of the pipeline 12, interposed between the wellhead 10 and the pipeline 12. FIG. 2 also shows that the riser 16 may take the form of a catenary riser.

In practice, subsea processing systems comprise multiple subsea processing units such as multiphase pumps, gas compression units and separators. Specific examples of subsea units are: a separation module as disclosed in WO 03/078793; a multiphase separation unit as disclosed in WO 03/087535; a compressor as disclosed in WO 2012/163996; an electronics module as disclosed in WO 2008/037267; and a separation vessel as disclosed in WO 2010/151392. Subsea processing systems may be configured to suit the characteristics of individual fields such as reservoir depth, pressure, temperature, gas-oil ratios, water cut and the distance to host facilities.

Subsea processing units may be very bulky: for example, subsea separators may weigh around 1000 tonnes each. To some extent, this reflects oversizing for maximum reliability during the lifetime of the field, hence increasing the cost, size and weight of each unit.

Other challenges of subsea processing include congestion of the seabed near the wellheads, poor accessibility for maintenance and repair, and the need for additional umbilicals to power the various subsea processing units.

A particular challenge of subsea processing systems is their complex installation and tie-in methodology. Typically, the pipeline 12 is installed between the wellhead 10 or a manifold and the target location of the subsea processing unit 20. Then, the subsea processing unit 20 (including its foundations) is installed by lifting it and lowering it to its target location, whereupon the pipeline 12 and the subsea processing unit 20 are tied by jumpers or spools 22. Umbilicals 24 are installed between the subsea processing unit 20 and a surface unit. The process requires various different installation vessels to be on site, some of which must be equipped with large cranes, and so involves huge cost and a lengthy timescale. Of course, the cost and timescale may be increased unexpectedly by the need to wait for acceptable weather conditions before performing each installation step.

Previously-qualified subsea processing units have been proposed or designed and installed, and are in use to varying degrees around the world. However, subsea processing remains a young technology in which it is vital to demonstrate reliability and serviceability of the system and its component units.

In many applications of the invention, the processed well fluid will be crude oil. Wherever the wellstream is dominated by oil, there is a threat of wax deposition on the inside of multiphase flow lines as the temperature of the wellstream falls below the wax formation temperature. It is known to deal with this issue by forcing wax formation upon cooling the wellstream in a Wax Control Unit or WCU, as used in a type of subsea processing called 'cold flow'. Cold flow refers to transportation of cold product which, for oil, typically means at a temperature below 50° C. Cold flow avoids the need for additional insulation or heating of the pipeline, which reduces the cost and allows a longer tie-back pipeline across the seabed between the wellhead and the riser.

In the WCU, the wellstream is cooled by heat exchange with cooling water around the flowline. This cools the wellstream enough to force wax to deposit on the inner wall of the flowline at predetermined locations. The wax deposits are removed by periodic, limited heating at those locations when feedback sensors indicate that the wax thickness is approaching an acceptance limit for a flowline section. Heating causes the wax layer to melt off and fall into the wellstream, where it is entrained to form a slurry that can be transported under cold flow conditions along a tie-back and to the surface unit.

Cold flow is known for onshore oil production but its applicability to subsea production is limited by constraints on installation and accessibility. However, some prior art disclosures of subsea applications are acknowledged below. In general, they will require subsea processing equipment that comprises discrete units separate from the pipeline, such as in WO 2012/099344, and so will require multiple installation steps.

U.S. Pat. No. 3,590,919 describes the principle of a cold flow subsea field, in which processing satellite units are arranged in the field near the wellheads. More recently, WO 2009/051495 describes subsea cold flow in a pipe-in-pipe arrangement with pulsed heating.

WO 2006/068929 discloses a cold flow production system in which an initial cooler unit forces the formation of wax in a slurry catcher. Then the remaining flow is transported into the pipeline system. An example of a slurry catcher is disclosed in WO 2010/009110. All units are separate from the pipeline and connected by jumpers. The slurry catcher must be cleaned out periodically using a pigging system.

In U.S. Pat. No. 5,154,741, crude oil flow is treated to separate oil and gas and to transport gas without risk of hydrate formation by removing condensates. The fluids are not transported under cold flow conditions: there is no mention of cooling.

WO 00/25062 describes a cold flow system in which additional gas hydrates are injected into the oil flow before cooling, in order to increase the rate of initial wax formation and to remove all wax at once. This leaves no residual water.

A cold flow system disclosed in WO 2007/018642 is connected to an onshore installation but the method of installation is not specified. Conversely in WO 2012/149620, depressurising modules are added along the pipeline to avoid formation of wax and hydrates. Also, WO 2004/033850 describes a coiled pipe that is inserted into the pipeline for flow assurance purposes but with no subsea processing.

It is known to group subsea units onto one frame or into one structure so as to require as few installation operations as possible. For example, a combined towing head for a flowline bundle is described in OTC 6430 (OTC Conference, 1990), where the head includes valves, connectors and manifolds to connect to a wellhead or to wellhead jumpers. In effect, the head is a combination of a conventional PLET, manifold and towhead. A similar arrangement is disclosed in EP 0336492. However, the towing head assembly is essentially passive and has no integral treatment or processing capability. The towing head is not used for processing but for pulling the bundle: some buoyancy or ballast may be added for this purpose. Also, most prior art relating to bundles is concerned with heating or hot bundles and not with cooling the wellstream.

In this respect, a manifold may be distinguished from a processing unit: the latter can modify the nature, temperature and/or composition of well fluid whereas the former cannot. In contrast, a manifold acts only on flow rate without pumping, and essentially includes only piping and valves although it may also include sensors and control system for valves.

US 2004/0040716 discloses a pipe-in-pipe flowline in which a hydrocarbon-transporting pipe is placed coaxially within an outer carrier pipe and the annulus between the pipes is filled with thermally insulating material. The hydrocarbon liquid has its temperature maintained above solidification/precipitation temperature by heat from an active heating system involving hot liquid being passed along the annulus. US 2003/0056954 discloses a flow-assurance system in which an inner pipe is disposed within an outer pipe to assure flow through the outer pipe. Hot fluids pass through the inner pipe to maintain the temperature of the fluids flowing through the outer pipe; also, chemicals may flow through the inner pipe to condition the fluids in the outer pipe. These documents do not disclose cold flow: they merely represent the prior art background to cold flow.

US 2009/0020288 discloses a flow-assurance system that involves chilling a hydrocarbon production flow in a heat exchanger and causing solids to form and then periodically removing deposits and placing them in a slurry by using a closed-loop pig launching and receiving system. This is a variant of cold flow but is of no more than background relevance to the invention.

Against this background, the invention resides in a wax control element for subsea processing of well fluids in a wellstream, the element comprising a bundle of flowlines within an elongate tensile structure that defines inlet and outlet ends and that has cooling and heating provisions for acting on the flowlines, in use, to promote deposition of wax in the flowlines and subsequent entrainment of wax in the wellstream.

The tensile structure may, for example, be an outer pipe surrounding the flowlines. Flowlines are preferably disposed in parallel but connected in series within the tensile structure such that the wellstream reverses in flow direction between one flowline and the next within the element.

A power connection may extend along the element between the inlet and outlet ends; similarly a data connection may extend along the element between the inlet and outlet ends.

The inventive concept also embraces a towable unit for controlling wax in subsea well fluids, comprising a wax control element of the invention whose tensile structure extends between, and is capable of acting in tension between, a first towhead at an upstream end of the element and a second towhead at a downstream end of the element.

At least one of the towheads, most preferably the first, upstream towhead, preferably has an on-board processing facility for processing the well fluids, which facility effects at least separation of water phases that are present in the well fluids. A power station may be housed in the second, downstream towhead, in which case an umbilical distribution system for distributing power and/or chemicals to external templates or satellite wellheads is preferably also housed in the second, downstream towhead.

The first, upstream towhead suitably also comprises facilities selected from a set comprising: connections to wellhead(s) or to a production manifold; water separation; removed water treatment and/or re-injection; cold flow conditioning for transportation; cold-water circulation systems; pigging facilities; and local heating systems for wax removal.

At least one and optionally both of the towheads may have a pump for pumping cooling water along the element to cool its flowlines; similarly, at least one and optionally both of the towheads may have a heating system for applying heat to flowlines of the element.

The inventive concept extends to a subsea oil or gas production system comprising at least one wax control element of the invention or at least one towable unit of the invention.

The inventive concept also extends to a method of installing or developing a subsea oil or gas production system by installing a prefabricated wax control unit at an installation location, the unit comprising an elongate wax control element disposed between a first towhead at an upstream end of the element and a second towhead at a downstream end of the element, the method comprising: towing the unit to the installation location with an elongate tensile structure of the wax control element in tension between the towheads; sinking the unit at the installation location; and connecting the towheads to other elements of the production system so that the unit may be operated to pass the well fluid along the wax control element.

Wax control may be effected by passing well fluid along the wax control element between the towheads while cooling and periodically heating flowlines of the wax control element.

Thus, the unit may be operated to pass well fluid along a bundle of flowlines within the elongate tensile structure of the wax control element, whereby cooling and heating of the flowlines can promote deposition of wax in the flowlines and subsequent entrainment of wax in a wellstream of the well fluid.

The invention therefore contemplates a wax control unit that is integrated into a bundle system. A pipe-in-pipe heat exchanger may ensure that the wellstream is cooled down sufficiently to enable a forced wax deposit at the flowline inner wall. In preferred embodiments, three pipe sections of individual lengths of about 1.0 to 2.0 km are routed within a bundle carrier pipe. Each pipe section is surrounded by individual sleeve pipes in a pipe-in-pipe arrangement.

In preferred embodiments, the invention is part of a system solution to integrate required functions for subsea processing into towhead structures for bundles. Towhead structures and an intermediate bundle section form a unit that functions as a subsea processing centre for surrounding subsea production satellites and templates and that can be used for long-distance tie-back of subsea field developments. By doing so, the invention provides a new concept for subsea processing that provides reliable and flexible solutions for field developments.

Among the benefits of incorporating the processing units into bundles and their towheads is that the system can be prefabricated, assembled and tested onshore before towing to the field for installation. As noted previously, the reliability of subsea processing equipment is crucial in ensuring the success of any subsea processing project. Onshore prefabrication and testing greatly improves the reliability of the system, as compared with connecting up units at a subsea location and performing tests there. An additional improvement in reliability arises from a drastic reduction in the number of subsea-connected interfaces.

The weight of subsea processing units increases with each added function, yet the invention allows an installation method without the use of large crane vessels. For example, the system can be towed to the field using the 'controlled depth tow' method, which ensures low-stress installation without the use of large crane vessels being dependent on low installation sea states. This makes installation less weather sensitive, and reduces the cost of installation vessels significantly. In general, therefore, the invention provides a compact and flexible layout with reduced cost from a fast and simple installation.

The introduction of a towed processing system for cold flow of hydrocarbons as described in this specification promises to fulfil the industry vision of 'subsea factories'. By including components that can receive well fluids from different in-field flowlines, separate the wellstream to remove contaminants, cool the wellstream and at the same time continuously assure the flow at low temperatures and sufficient pressure, the system may significantly affect the design of pipeline and riser systems. The design of downstream pipeline and riser systems can be simplified as their temperature requirements are consequently relaxed.

By introducing a pre-tested processing centre that can process and cool down the wellstream, it is possibly also to simplify the pipeline and riser systems against the host platform. Such pipeline and riser systems can then be manufactured without the use of insulation and active or passive heating. This enables longer tie-back distances at a relatively low cost and with reduced power consumption, which will make certain field developments more favourable.

A pre-processing central unit of the invention can work in many different configurations. For example, it can serve as a manifold for individual wells located in a specific area or it can be tied directly in to a larger subsea template.

The invention provides a new method for design, fabrication, installation and operation of oil- or gas-dominated field developments, as the compact layout of the subsea processing centre can be configured to suit both oil-or gas-dominated wellstreams.

Where the processed fluid is crude oil, wax removal may be performed but in a first step, a separation unit allows separation of at least water from other components of the crude oil. This water can be re-injected into the well. This reduces the maximal quantity of wax susceptible to be generated when cooling the crude oil. The next step, which is optional, may include gas separation, sand removal and injection of chemicals into the wellstream.

Then, the crude oil (with any residual water) is cooled down by thermal exchange with the surrounding water. The oil circulates in a pipe-in-pipe arrangement whose annulus is filled by pumped cold water. The resulting cooling generates wax deposits in identified locations. The pipe-in-pipe is convoluted into a long bundle in which the flow may return several times within the cooling unit to force wax deposits near the upstream, process end of the system. The system may be connected to a riser at the downstream end. Wax deposits are removed by periodic, limited heating at determined locations. Pigging facilities, which may be removable, may be used to test and maintain the pipeline.

In order that the invention may be more readily understood, reference will now be made, by way of example, to the accompanying drawings, in which.

Figure 1:
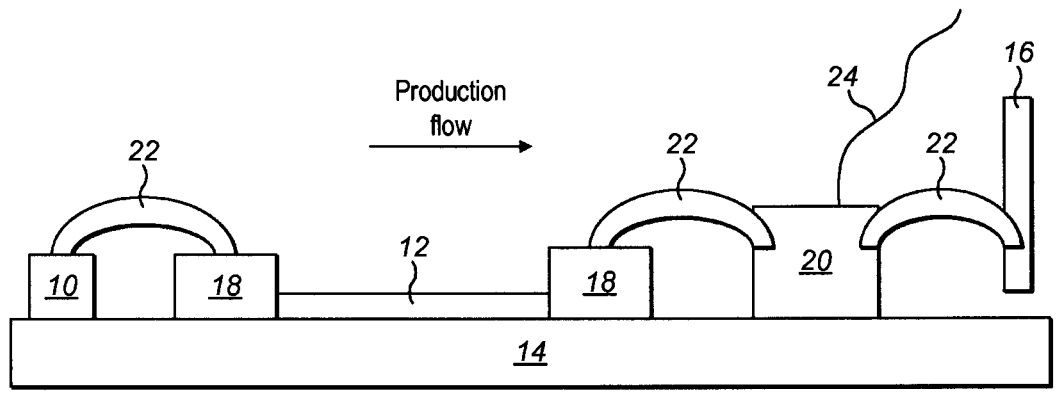
FIG. 1 is a schematic diagram of a prior art solution involving subsea processing of a wellstream, in which a processing unit is disposed downstream of a pipeline.
Figure 2:
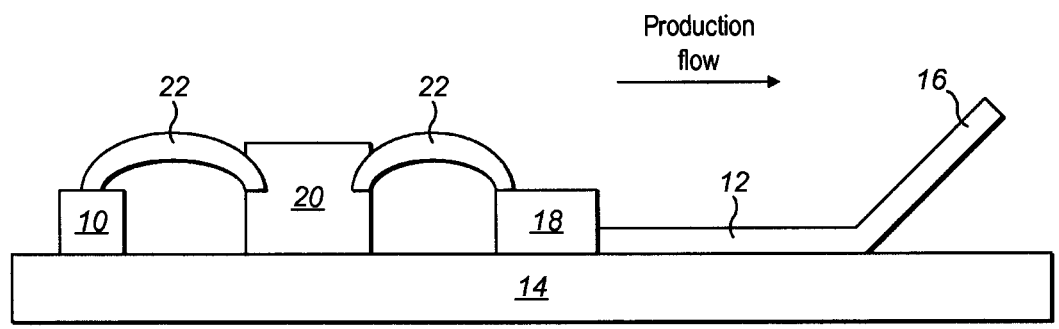
FIG. 2 is a schematic diagram of another prior art solution involving subsea processing of a wellstream, in which a processing unit is disposed upstream of a pipeline.
Figure 3:
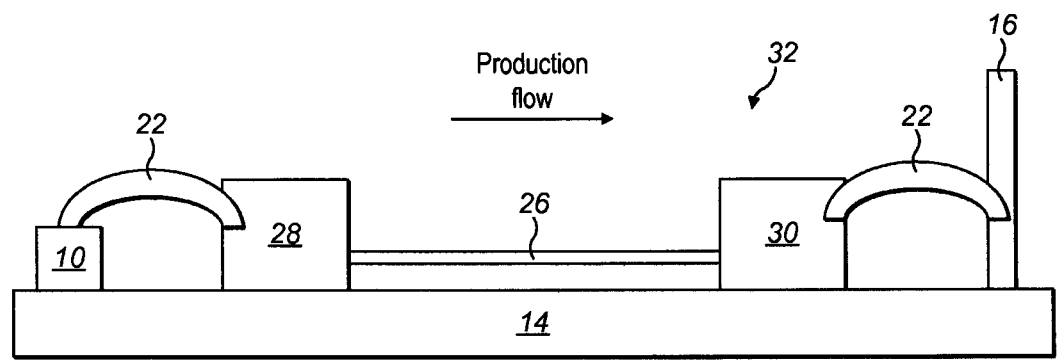
FIG. 3 is a schematic diagram of a subsea processing solution of the invention employing a towable unit comprising a pipeline bundle with a towhead at each end.

Reference has already been made to FIGS. 1 and 2 of the drawings to describe subsea processing solutions known in the prior art. FIG. 3 illustrates the invention in a similarly simplified, schematic style; again, like numerals are used for like features. Thus, the direction of production flow is again from left to right as shown, from a wellhead 10 to a riser 16. The riser 16 is shown here in the form of a riser column or tower like that of FIG. 1, but it may of course take another form such as a catenary.

In FIG. 3, the pipeline 12 laid across the seabed 14 between the wellhead 10 and the riser 16 is replaced by a pipeline bundle 26. Also, the termination structures 18 of FIGS. 1 and 2 are replaced by an upstream towhead 28 at an upstream end of the pipeline bundle 26 and a downstream towhead 30 at a downstream end of the pipeline bundle 26. Thus, the upstream towhead 28 is interposed between the wellhead 10 and the pipeline bundle 26 whereas the downstream towhead 30 is interposed between the pipeline bundle 26 and the riser 16.

In accordance with the invention, either and preferably both of the towheads 28, 30 comprises facilities for processing the wellstream before it flows up the riser 16, and so also replaces the processing unit 20 of FIGS. 1 and 2. Thus, either and preferably both of the towheads 28, 30 serves as an integrated termination structure and processing unit. The invention therefore aims to mitigate several of the drawbacks of subsea processing by grouping subsea processing units with the pipeline bundle 26. Also, distributing the processing units among the towheads 28, 30 spreads the weight of the process system and locates the units appropriately at the inlet or outlet end of the pipeline bundle 26.

The pipeline bundle 26 and the towheads 28, 30 together constitute a single towable unit 32 that, highly advantageously, may be fabricated and tested onshore before being towed as one unit to an installation site. Once fabricated onshore, the whole unit 32 may be pulled into the water, as is already done in the oil and gas industry with the pipe bundles that form hybrid riser towers.

In the context of towing, the upstream towhead 28 may be described as a leading towhead and the downstream towhead 30 may be described as a trailing towhead. Towing and installation will be described in more detail below with reference to FIGS. 7a and 7b of the drawings.

The pipeline bundle 26 acts in tension between the towheads 28, 30 during towing, with tensile loads being borne by the pipes of the bundle 26 or, preferably, principally or exclusively by an outer pipe or other protective structure that surrounds the pipes of the bundle 26. This arrangement will be described in more detail below with reference to FIG. 12 of the drawings.

In the simplified arrangement shown in FIG. 3, jumper pipes or spools 22 connect the upstream towhead 28 to the wellhead 10 and the downstream towhead 30 to the riser 16. However, the towheads 28, 30 may be connected to the wider subsea production system in other ways, for example via manifolds, and so need not be connected as directly to the wellhead 10 and to the riser 16.

As FIG. 6 will show later, a power umbilical as shown in FIG. 1 may extend from a surface unit (not shown) to one of the towheads 28, 30 to provide power to its processing facilities. Advantageously, power may be transmitted from one towhead 28, 30 to the other towhead 28, 30 through power cables in the pipeline bundle 26. This allows one umbilical to be connected to just one of the towheads 28, 30 and yet to provide power to both of the towheads 28, 30.

Figure 4:
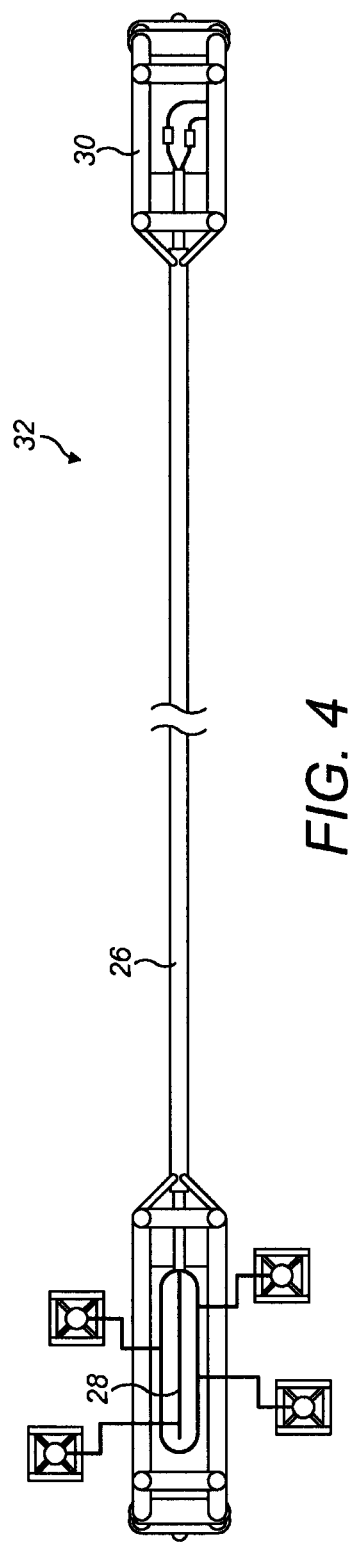
FIG. 4 is a top plan view of a towable unit of the invention in a practical form.

FIG. 4 shows the towable unit 32 in a practical form, with a long pipeline bundle 26 connecting a larger upstream towhead 28 and a smaller downstream towhead 30. As will be explained, the upstream towhead 28 includes a manifold in this instance and so is optimised to gather fluid production from multiple wellheads. A variant of the upstream towhead 28 that encompasses the wellhead or provides drilling slots will be described later with reference to FIGS. 9 and 10.

Figure 5:
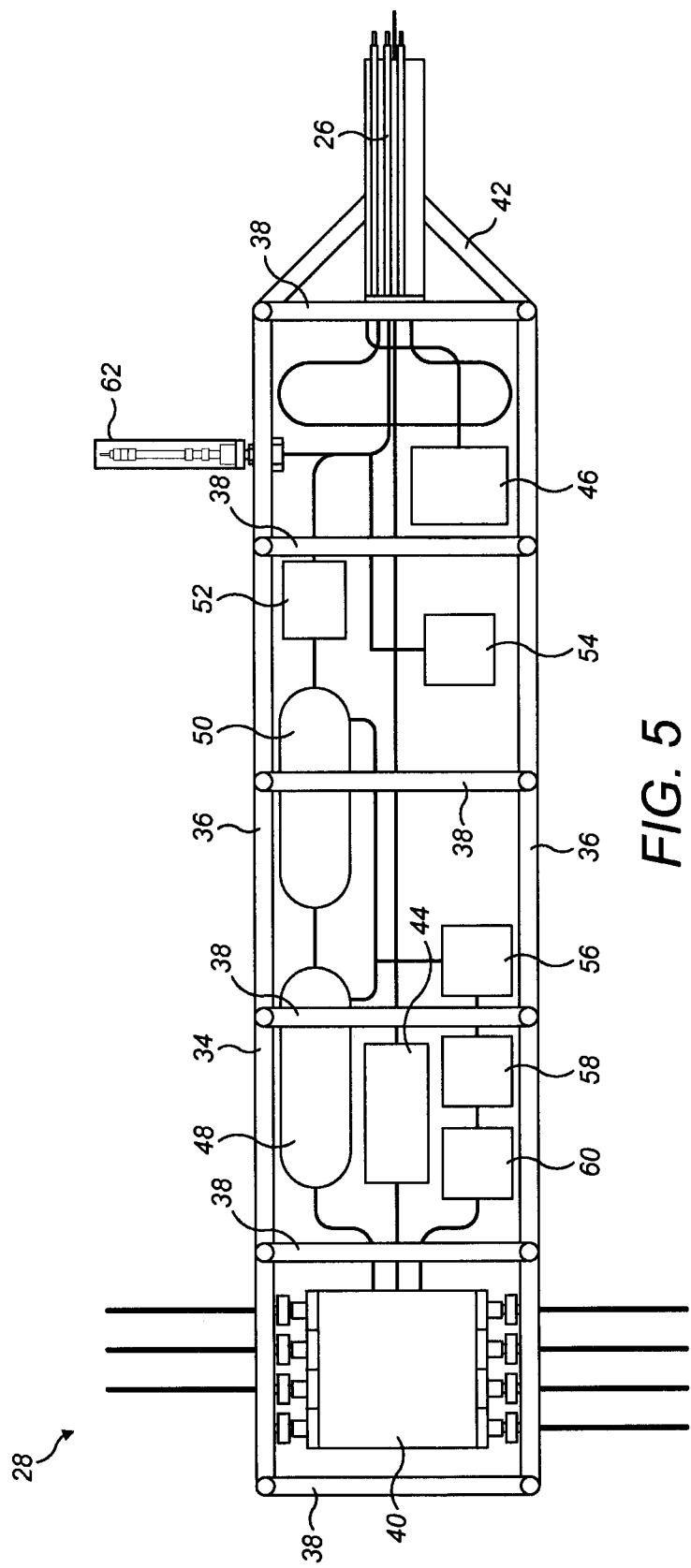
FIG. 5 is a schematic plan view of an upstream towhead used in a towable unit of the invention.
Figure 6:
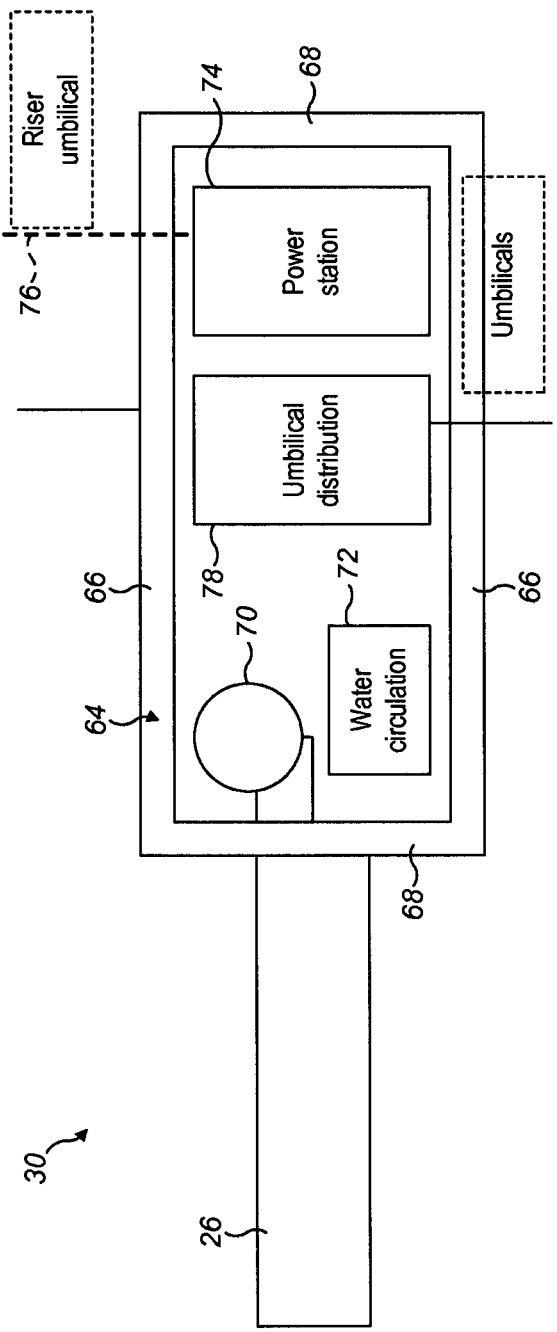
FIG. 6 is a schematic plan view of a downstream towhead used in a towable unit of the invention.

Moving next to FIGS. 5 and 6, these show the towheads 28, 30 in more detail. Specifically, FIG. 5 shows the upstream towhead 28 whereas FIG. 6 shows the downstream towhead 30.

The upstream towhead 28 shown in FIG. 5 comprises an elongate tubular steel lattice frame 34 of generally rectangular cross-section. As a non-limiting example, the frame 34 may be considerably in excess of forty metres long and more than eight metres high and wide. The frame 34 comprises four parallel longitudinal members 36 joined by cross-members 38, with gaps between the cross-members 38 providing access to bays for installation, maintenance and replacement of processing and flow-handling equipment carried by the towhead 28. The processing and flow-handling equipment is largely carried within the cross-section of the frame 34, although some elements of that equipment may protrude from the frame 34.

FIG. 5 shows processing and flow-handling equipment carried by the upstream towhead 28. At its upstream end, the frame 34 of the towhead 28 defines a bay that houses a manifold 40 for in-field flowlines and for water injection. At its downstream end, the frame 34 has a tapering nose structure 42 to anchor one end of the pipeline bundle 26 against tensile loads. From there, the pipeline bundle 26 extends over a considerable distance (typically 1.5 to 2.0 km) to the downstream towhead 30, which will be described later with reference to FIG. 6. The frame 34 also carries a system control module 44 that may be connected through the pipeline bundle 26, as shown, to control the downstream towhead 30.

It has been noted above that where the processed well fluid is crude oil, there is a threat of wax deposition as the temperature of the wellstream falls below the wax formation temperature. Wax deposition is controlled by wax control features in the pipeline bundle 26. This is the purpose of a cooling water pump 46, which drives cooling water along the pipeline bundle 26 as will be explained later with reference to FIGS. 11 and 12 of the drawings. However, there is also a threat of hydrate formation as the temperature of the wellstream falls below the hydrate formation temperature. Consequently, much of the equipment between the manifold 40 and the pipeline bundle 26 is concerned with hydrate control.

The effect of hydrate formation can be significantly reduced, indeed almost eliminated, by separating water out of the wellstream. Consequently, the hydrate control equipment of the upstream towhead 28 comprises two separation stages 48, 50 downstream of the manifold 40, followed by a coalescer 52. Subsea separation of water is a known and qualified technology that typically leaves less than 2% of water in the wellstream after a two-stage separation. The small amount of water remaining in the wellstream can be handled by adding anti-agglomerates to the wellstream at a hydrate control unit 54 after separation and coalescence.

Separated water is cleaned in a hydro-cyclone 56 and then re-injected into the reservoir via the manifold 40 by using a booster pump 58 and a water injection pump 60.

Routine optional steps of gas separation and sand removal may also be performed by equipment in the upstream towhead 28, although that equipment has been omitted from FIG. 4 for clarity.

Pigging facilities (which may be removable) are provided to test and maintain the pipeline and particularly the pipes of the pipeline bundle 26. A removable pig launcher 62 is shown in FIG. 4. However, it should be noted that systematic pigging such as is required by WO 2006/068929 is obviated by first separating water from the crude oil as described above, which drastically reduces the residual quantity of wax and hydrates.

Turning now to the downstream towhead 30 shown schematically in FIG. 6, this also comprises an elongate tubular steel lattice frame 64 of generally rectangular cross-section comprising four parallel longitudinal members 66 joined by cross-members 68. The downstream towhead 30 is somewhat shorter than the upstream towhead 28 but is suitably of similar cross-sectional size.

The frame 64 of the downstream towhead 30 carries a pipeline connector 70 communicating with the pipeline bundle 26 for downstream transport of the wellstream. For example, there may be cold-flow transport of the wellstream along a long tie-back pipeline on the seabed, or the wellstream may be carried by a jumper or spool into an adjacent riser structure.

A second cooling water pump 72 mirrors the cooling water pump 46 of the upstream towhead to drive cooling water along the pipeline bundle 26. This duplication of water pumps 46, 72 minimises pumping losses and provides redundancy to maintain cooling in the event of failure or downtime due to maintenance.

The frame 64 of the downstream towhead 30 also carries a power station 74 that takes electrical power from a riser umbilical 76. The power station 74 supplies power to: an umbilical distribution system 78; to other equipment carried by the frame 60, such as the cooling water pump 72; and also via the pipeline bundle 26, as shown, to power the upstream towhead 28. The umbilical distribution system 78 includes connection points for plugging in umbilicals as well as fuses and transformers. Those features are routine and need no elaboration here.

In summary, therefore, the upstream towhead 28 includes: connections to wellhead(s) or to a production manifold; water separation; removed water treatment and/or re-injection; cold flow conditioning for transportation; cold-water circulation systems and local heating systems for wax removal. However cold-water circulation systems and local heating systems could also, or alternatively, be located in the downstream towhead 30. It is also possible for pigging facilities to be located on either towhead 28, 30.

Figure 7A:
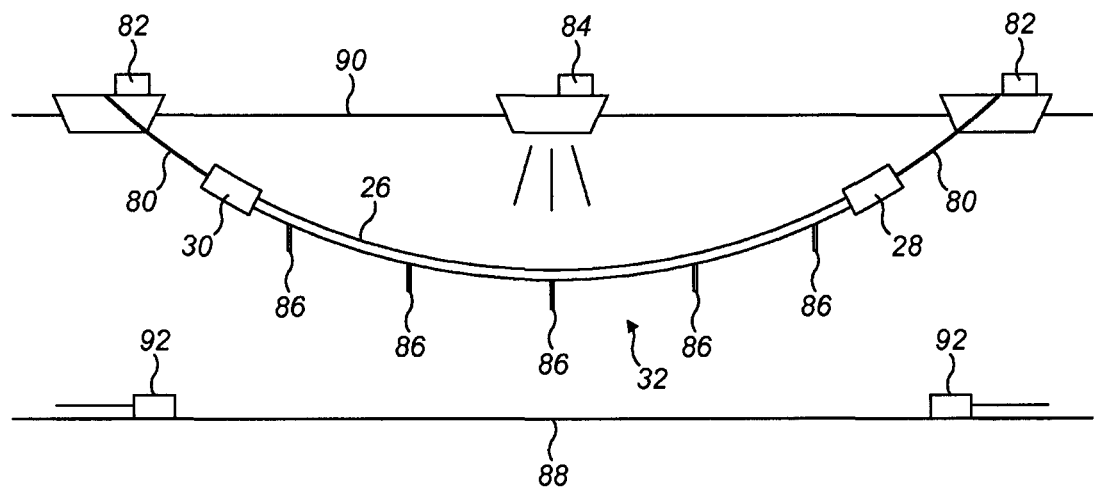
FIGS. 7a and 7b show, respectively, towing and installation steps performed with the towable unit of the invention.
Figure 7B:
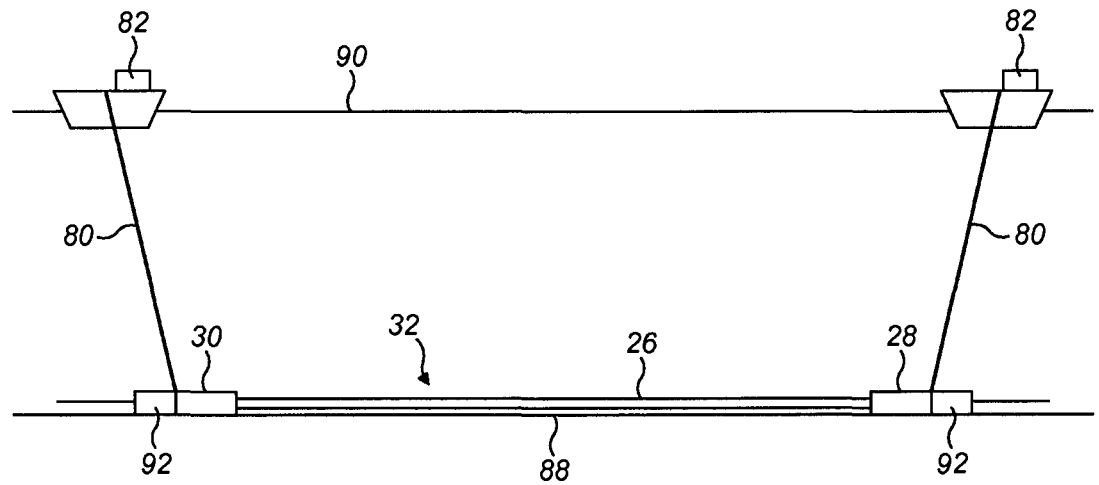

Turning next to FIGS. 7a and 7b of the drawings, pipeline installation by towing is well known in the art. In this respect, a convenient towing technique for use with the invention is the Controlled Depth Towing Method (CDTM), which is described in technical papers such as OTC 6430 noted previously. This technique involves far fewer installation steps than in prior art subsea processing systems and it does not require installation vessels with particularly large cranes or great lift capacity. At the installation site, the towable unit 32 can be lowered into a predetermined gap in the subsea production system in a 'plug and play' manner, whereupon the unit 32 may be connected via jumpers or spools at each towing head 28, 30 to other elements of the production system, which may be placed on the seabed before or after the unit 32.

Reference is made to OTC 6430 for a more detailed description of the CDTM technique but a brief description follows in the context of the present invention. The CDTM principle involves the transportation of a prefabricated and fully-tested towable unit 32 suspended on towing lines 80 between two installation vessels 82, which may be tugs. A third vessel 84 may be employed for monitoring purposes as shown in FIG. 7a. An outer pipe surrounding the pipeline bundle 26 may be used to define a chamber to adjust buoyancy, or buoyancy may be adjusted by modules attached to the pipeline bundle 26. Chains 86 attached to the pipeline bundle 26 provide additional weight so that, at rest, the pipeline bundle 26 floats clear of the seabed 88 but beneath the influence of wave action near the surface 90.

When the towable unit 32 reaches the installation location, it is lowered toward the seabed 88 by reducing its buoyancy, for example by flooding the outer pipe surrounding the pipeline bundle 26, while the towing lines 80 are paid out from the installation vessels 82. The towable unit 32 then settles on the seabed 88 as shown in FIG. 7b, whereupon tie-ins to prelaid elements 92 of the subsea production system can be made, for example using jumpers or spools (not shown) fitted with suitable known connectors.

Figure 8:
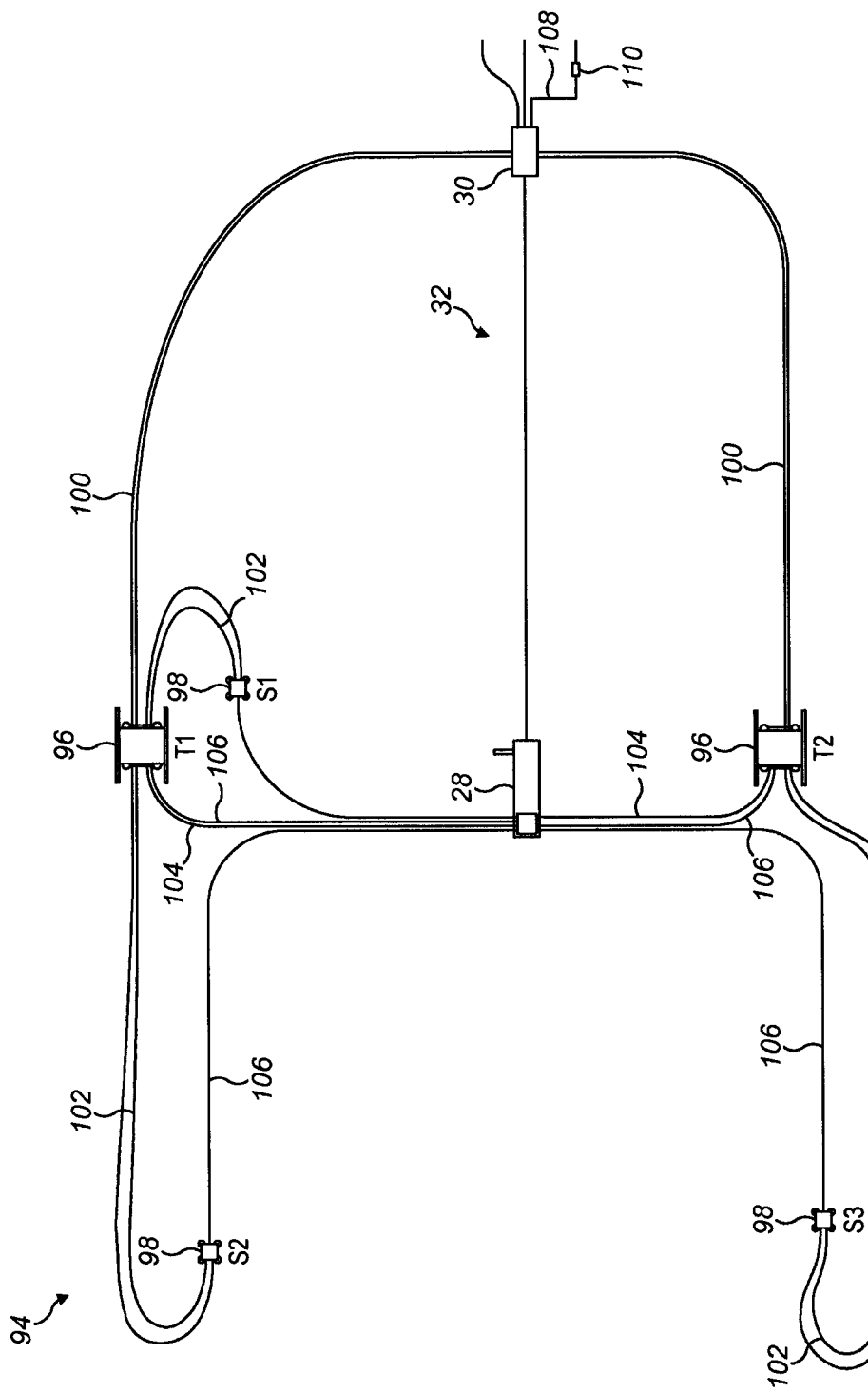
FIG. 8 is a top plan view of a subsea production installation incorporating the towable unit of the invention.

FIG. 8 shows in more detail how the towable unit 32 fits into a subsea production system 94. In this example, the subsea production system 94 comprises two templates 96 and three satellite wellheads 98. The templates 96 are supplied with power and chemicals from the downstream towhead 30 through primary umbilicals 100. Secondary umbilicals 102 supply power and chemicals from the templates 96 to the satellite wellheads 98. Such chemicals may be remediation fluids such as methanol or diesel oil that may be injected for maintenance purpose into the valves of a wellhead, after a shutdown, to remove wax where it may appear. The templates 96 are also supplied with water for injection from the manifold 40 of the upstream towhead 28 through water lines 104.

Production flowlines 106 carry well fluids from the templates 96 and the satellite wellheads 98 back to the manifold 40 of the upstream towhead 28 for processing as described previously. The resulting wellstream then passes along the pipeline bundle 26 for wax control before passing through a spool 108 to a Pipeline End Module (PLEM) 110 for onward transport in a cold flow state.

Figure 9:
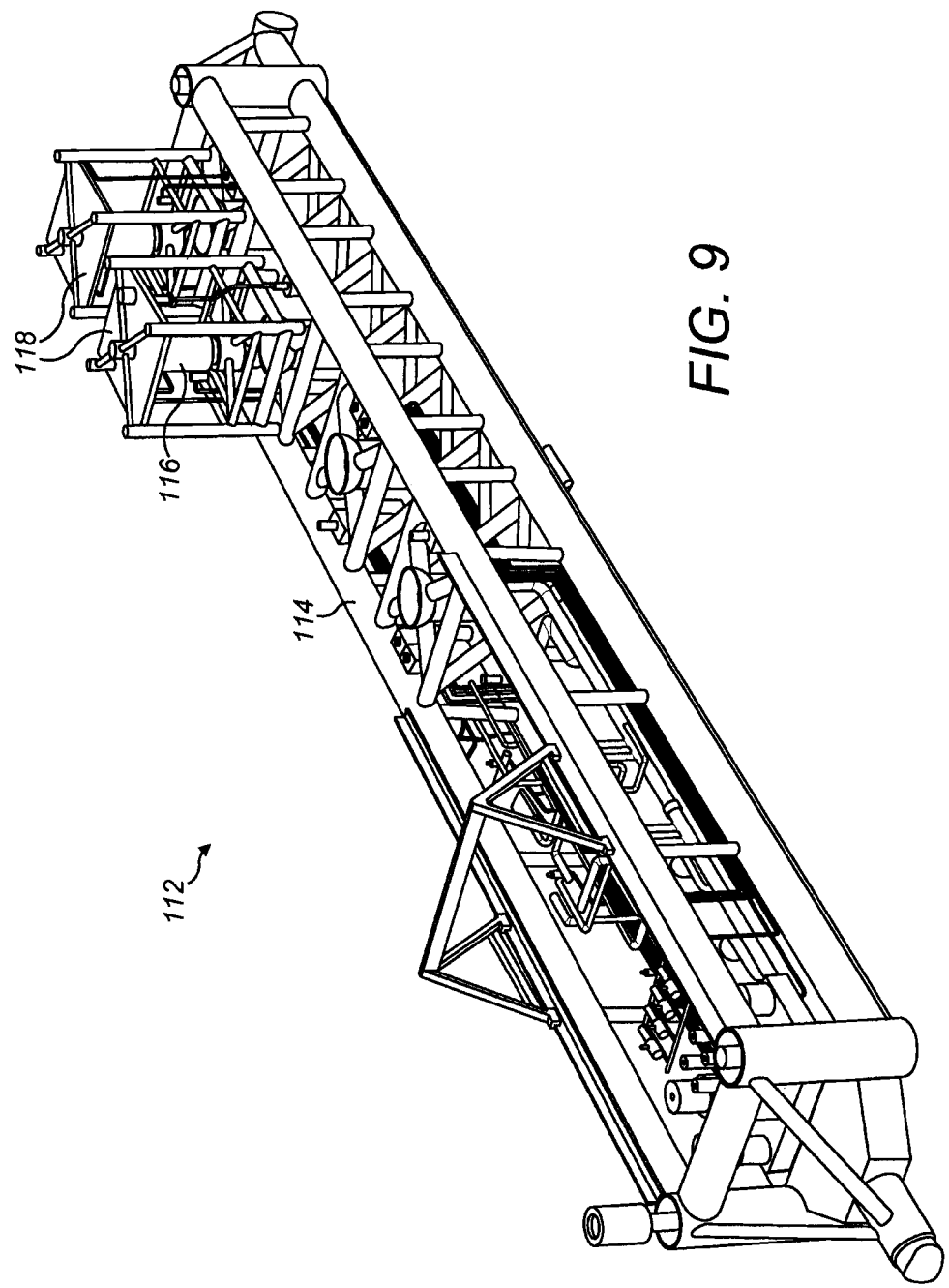
FIG. 9 is a perspective view of a variant of the upstream towhead shown in the towable unit of FIG. 4.
Figure 10:
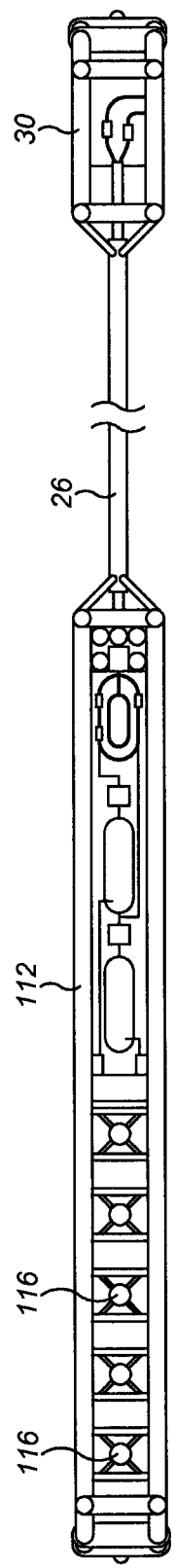
FIG. 10 is a top plan view of a towable unit of the invention including the variant of the upstream towhead shown in FIG. 9.

FIG. 9 shows a variant 112 of the upstream towhead 28 shown in FIG. 5. FIG. 10 shows that upstream towhead variant 112 in the context of a towable unit that also comprises a pipeline bundle 26 and a downstream towhead 30 as previously described.

The upstream towhead variant 112 has an elongated frame 114 to encompass wellheads 116 or to provide a corresponding array of drilling slots. Again, the processing and flow-handling equipment is largely carried within the cross-section of the frame 114. However, some equipment may protrude from the frame 114, such as the wellhead equipment 118 seen protruding from the top of the frame 114 at its upstream end to the top right in FIG. 9. The open-topped structure of the frame 114 is beneficial in this respect; some such equipment 118 may be landed into the frame 114 after the upstream towhead variant 112 has been installed on the seabed.

Figure 11:
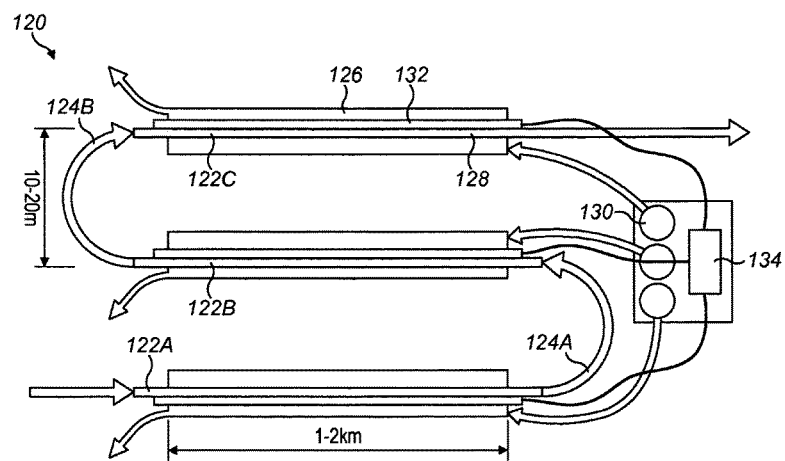
FIG. 11 is a schematic plan view of a prior art solution for wax control.
Figure 12:
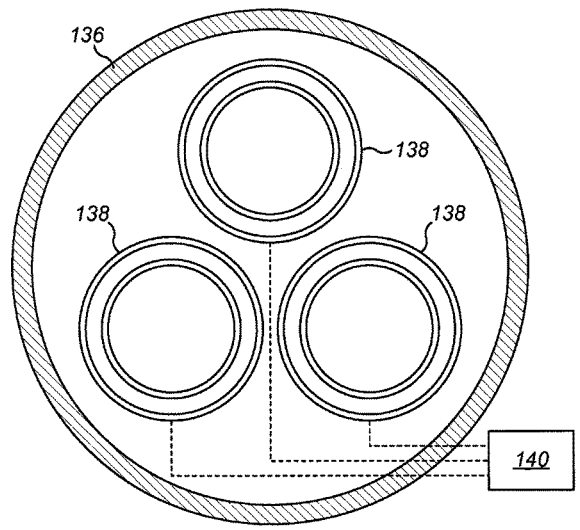
FIG. 12 is a schematic cross-sectional view of a pipeline bundle for wax control in accordance with the invention.

Moving on finally now to FIGS. 11 and 12 of the drawings, these show how the pipeline bundle 26 may be arranged to control wax formation. FIG. 12 shows the pipeline bundle 26 of the invention but to illustrate the general principle, FIG. 11 shows a prior art wax control system 120 which will be described first.

The wax control system 120 of the prior art comprises long pipes 122 laid on the seabed, in this example three pipes, each of which is about 1.0 to 2.0 km in length. The pipes 122 are disposed in parallel about 10 to 20 m apart on the seabed but are connected in series by spools 124. Consequently, the wellstream flows in a first direction through a first pipe 122A, reverses direction in a first spool 124A, flows in the opposite direction through a second pipe 122B, reverses direction in a second spool 124B, and flows back in the first direction through a third pipe 122C before exiting the wax control system 120. Having therefore travelled between about 3.0 and 6.0 km in this example, the wellstream exits the wax control system 120 in a much-cooled state.

The pipes 122 are each of pipe-in-pipe (PiP) construction to define annular jackets 126 around flowlines 128. To cool the wellstream in the flowlines 128, pumps 130 pump raw seawater into the jackets 126 from one end of the system 120, providing beneficial counterflow in the first and third pipes 122A, 122C if not in the second pipe 122B. This cools the wellstream enough to force wax to deposit on the inner walls of the flowlines 128.

The wax deposits are removed periodically by localised heating when feedback sensors (not shown) indicate that the wax layer has reached a limiting thickness. Heating is achieved by heating cables 132 that extend along the outside of the flowlines 128 within the annular jackets 126; when powered by a power unit 134, the heating cables 132 cause the wax layer to melt off and become entrained in the wellstream.

The wax control system 120 of the prior art would be of no use for the purposes of the present invention, where the pipeline bundle 26 is apt to be used as a tensile member in a towable unit 32, 114. In contrast, the pipeline bundle 26 of the invention shown in cross section in FIG. 12 comprises an outer pipe 136 that surrounds three PiP sections 138. The PiP sections 138 are joined in series and extend in parallel like the prior art shown in FIG. 11; there could be more or fewer of them. The outer pipe 136 protects, supports and retains the PiP sections 138 and also bears most or all of the tensile loads experienced by the pipeline bundle 26 during fabrication, towing and installation of the towable unit 32, 114.

It will, of course, be understood that the cross-sectional view of FIG. 12 is simplified and omits details of coatings and linings as well as heating arrangements.

Cooling and heating may be achieved in various ways, although an advantage of distributed water cooling pumps in both towheads 28, 30 is that beneficial counterflow of cooling water may be achieved in all of the PiP sections 138. There must be an expansion loop at each end of the multiphase flowline allowing for expansion in the region of 0.5 m.

Each PiP section 138 is connected to a heating system 140 based on AC power from the power station 74 of the downstream towhead 30. The heating system 140 can be either a DEH (direct electrical heating) or a SECT (skin effect current tracing) system. The latter is currently preferred due to lower power requirements but this is not essential. Both heating techniques, and indeed others, will be known to the reader skilled in the art of subsea oil and gas engineering.

As no intermediate processing stations such as pump systems need to be inserted into the pipeline bundle 26, this allows the bundle geometry to remain the same along its length to ease both fabrication and mechanical design.

The invention claimed is:

1. A method of installing or developing a subsea oil or gas production system by installing a prefabricated wax control unit at an installation location, the unit comprising an elongate wax control element disposed between a first towhead at an upstream end of the element and a second towhead at a downstream end of the element, the method comprising:

towing the unit to the installation location with an elongate tensile structure of the wax control element in tension between the towheads;

sinking the unit at the installation location;

connecting the towheads to other elements of the production system so that the unit may be operated to pass the well fluid along the wax control element; and passing well fluid along the wax control element between the towheads while cooling and periodically heating flowlines of the wax control element;

wherein cooling the flowlines comprises pumping cooling water along the wax control element in mutually opposed directions between the towheads.

2. The method of claim 1, comprising performing hydrate control on the well fluid in the first, upstream towhead.

3. The method of claim 2, wherein power and chemicals are distributed to templates and wellheads of the system from the second, downstream towhead.

\* \* \* \* \*